United States Patent [19]
Galvin et al.

[11] 3,760,400
[45] Sept. 18, 1973

[54] INTRUSION DETECTION SYSTEM EMPLOYING QUADRATURE SAMPLING

[75] Inventors: Aaron A. Galvin, Lexington; L. Dennis Shapiro, Lincoln, both of Mass.

[73] Assignee: Aerospace Research, Inc., Boston, Mass.

[22] Filed: Feb. 10, 1972

[21] Appl. No.: 225,049

[52] U.S. Cl............... 340/258 A, 340/276, 343/7.7
[51] Int. Cl. .......................................... G08b 13/24
[58] Field of Search....................... 340/258 A, 276; 343/7.7

[56] References Cited
UNITED STATES PATENTS 3,331,065  7/1967  McDonald ..................... 340/258 A
3,665,443  5/1972  Galvin............................ 340/258 A Primary Examiner—John W. Caldwell
Assistant Examiner—Glen R. Swann, III
Attorney—Joseph Weingarten et al.

[57] ABSTRACT

An intrusion alarm system for the reliable detection of moving targets in a manner which discriminates against noise and other interfering phenomena. Signals returned from a zone under surveillance are processed by quadrature-phased detectors, producing a pair of Doppler signals. Zero crossings of one Doppler signal are used to produce pulses that are employed to sample the other Doppler signal, the sampled signal being stored and integrated to provide an integrated output signal. An alarm indication is produced upon exceedance of a predetermined threshold by the integrated output signal. In the presence of interfering phenomena, the sample pulses occur at random times causing a bipolar fluctuating integrated output signal which does not cross the predetermined threshold. In the presence of a true moving target, sample pulses of regular timed relation are provided to cause an integrated output signal of sufficient value to exceed the predetermined threshold. An alarm indication is thereby provided only in response to a true moving target.

13 Claims, 16 Drawing Figures

Patented Sept. 18, 1973

Patented Sept. 18, 1973

INTRUSION DETECTION SYSTEM EMPLOYING QUADRATURE SAMPLING

FIELD OF THE INVENTION

This invention relates to intrusion detection systems and more particularly to systems for the electromagnetic detection of a moving target within an area of coverage.

BACKGROUND OF THE INVENTION

In electromagnetic intrusion alarm systems operative typically at ultrasonic or radar frequencies, a transmitted signal is directed into a zone under surveillance and a signal returned from a moving target within the zone is mixed with a portion of the transmitted signal to produce a beat frequency representative of the Doppler frequency of the moving target and which is sensed and employed to energize a suitable alarm. The efficiency and commercial utility of such intrusion alarm systems depend in large measure on the system ability to discriminate between true moving targets and interfering phenomena caused by conditions present in the surveillance zone. Interfering phenomena in a zone under surveillance are typically the result of movement of doors and windows, vibrating walls, and moving air currents, which can cause spurious alarm indications.

Techniques proposed heretofore for reducing the tendency of false alarms have, in general, employed gain or threshold compensation based upon a measurement of background noise or clutter averaged over a period of time. This type of gain or threshold variation is effective only if the interfering phenomena has a gradual onset. In practice, however, interfering phenomena often do not exhibit a gradual onset, but, rather, are abrupt such as caused by the starting and stopping of air conditioners, heaters and objects which spuriously move and vibrate. Gain or threshold compensation techniques are therefore not generally very effective against those spurious conditions often encountered in an actual working environment. In addition, variation of the gain of a system also causes variable detection sensitivity which also results in variable target detection range.

Another prior art technique for discriminating true moving targets from interfering phenomena has employed selective filtering to eliminate a major portion of Doppler noise energy caused by the interfering phenomena, while retaining sensitivity against a target moving at a relatively high radial velocity. Such systems sacrifice detection of targets moving at low radial velocities since, for such low velocities, the Doppler frequencies attributable to interfering phenomena are generally the same as those attributable to a true moving target.

A particularly effective system for discriminating moving targets from interfering phenomena is disclosed and claimed in the copending application of Aaron A. Galvin, entitled Ultrasonic Intrusion Alarm, Ser. No. 69,306, filed Sept. 3, 1970, now U.S. Pat. 3,665,443 and assigned to the assignee of the present invention, and in which certain spectral characteristics of moving targets and interfering phenomena are employed to achieve improved discrimination of moving targets in the presence of such phenomena. According to the system of the copending application, a pair of output signals is provided in response to a received signal the spectrum of which is balanced with respect to the transmitted carrier, while producing only one or the other of the pair of output signals in response to a received signal the spectrum of which is unbalanced with respect to the carrier. The spectrum caused by a true moving target is assymmetrical with respect to the carrier frequency causing one first or second output signal, and the alarm circuitry is configured to provide an alarm indication only in response to the first or the second output signal but not when both output signals are present in comparable proportion. The present invention provides a system for detecting moving targets from interfering phenomena with the effectiveness of the system of the copending application but utilizing a different technique of discrimination which is readily implemented by relatively simple circuitry.

SUMMARY OF THE INVENTION

In accordance with the present invention, an intrusion alarm system is provided in which quadrature phased signals are digitally decoded to provide an output indication of moving target presence and which is capable of a high degree of discrimination between true moving targets and interfering phenomena. A transmitted signal is directed into an area under surveillance and signals returned from objects and targets within the zone are received and processed in a pair of quadrature mixers to provide a pair of Doppler signals usually at audio frequencies. One of these signals is processed to derive sample pulses at its positive zero axis crossings. For a given target Doppler return, these pulses will occur at or near the peaks of the other Doppler signal. A representation of the sampled peak signal is stored and integrated to provide an integrated output signal which is compared with a reference bipolar threshold, and upon exceedance of the threshold by the integrated output signal, and alarm indication of target presence is produced.

In the presence of interfering phenomena, the sample pulses occur at random times causing a bipolar fluctuating integrated output signal which does not cross the predetermined threshold. In the presence of a true moving target, sample pulses of regular timed relation are provided to cause an integrated output signal of sufficient value to exceed the predetermined threshold. An alarm indication is thereby provided only in response to a true moving target.

In a typical embodiment of the invention, a first one of the Doppler signals is processed by a symmetrical limiter and applied to the signal input of a sample and hold circuit. The other of the Doppler signals is processed by a very-high-gain limiting amplifier which provides a rectangularly shaped output in response to received input signals. The rectangularly shaped output of the very-high-gain limiting amplifier is differentiated and the positive-going portion of the waveform is amplified to provide sample pulses to the trigger input of the sample and hold circuit. The sample pulses occur at the positive zero axis crossings of the very-high-gain limiting amplifier's output signal. The output of the sample and hold circuit is applied to a bipolar integrator which will integrate both positive and negative signals. The integrator output is applied to a bipolar threshold circuit the output of which drives an alarm indicator or other utilization apparatus.

Under conditions of interfering phenomena, such as broadband noise or clutter, the polarity of signals stored by the sample and hold circuit at the time of the sample pulse will be random in nature and, thus, the output signal from the sample and hold circuit will tend to vary in a generally symmetrical manner both above and below a reference level, generally taken to be system ground. The integrator under noise conditions will not charge sufficiently in either a positive or negative direction to exceed a predetermined threshold for alarm actuation. In the presence of a moving target, however, the sample pulse will occur at or near the positive or negative peak of each cycle of the quadrature channel signal, one polarity occurring for incoming targets and the other for outgoing targets. As a result, a unidirectional target will cause either a positive or negative charging of the integrator, the integrator output signal, upon exceedance of the predetermined threshold, causing an alarm indication of target presence.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
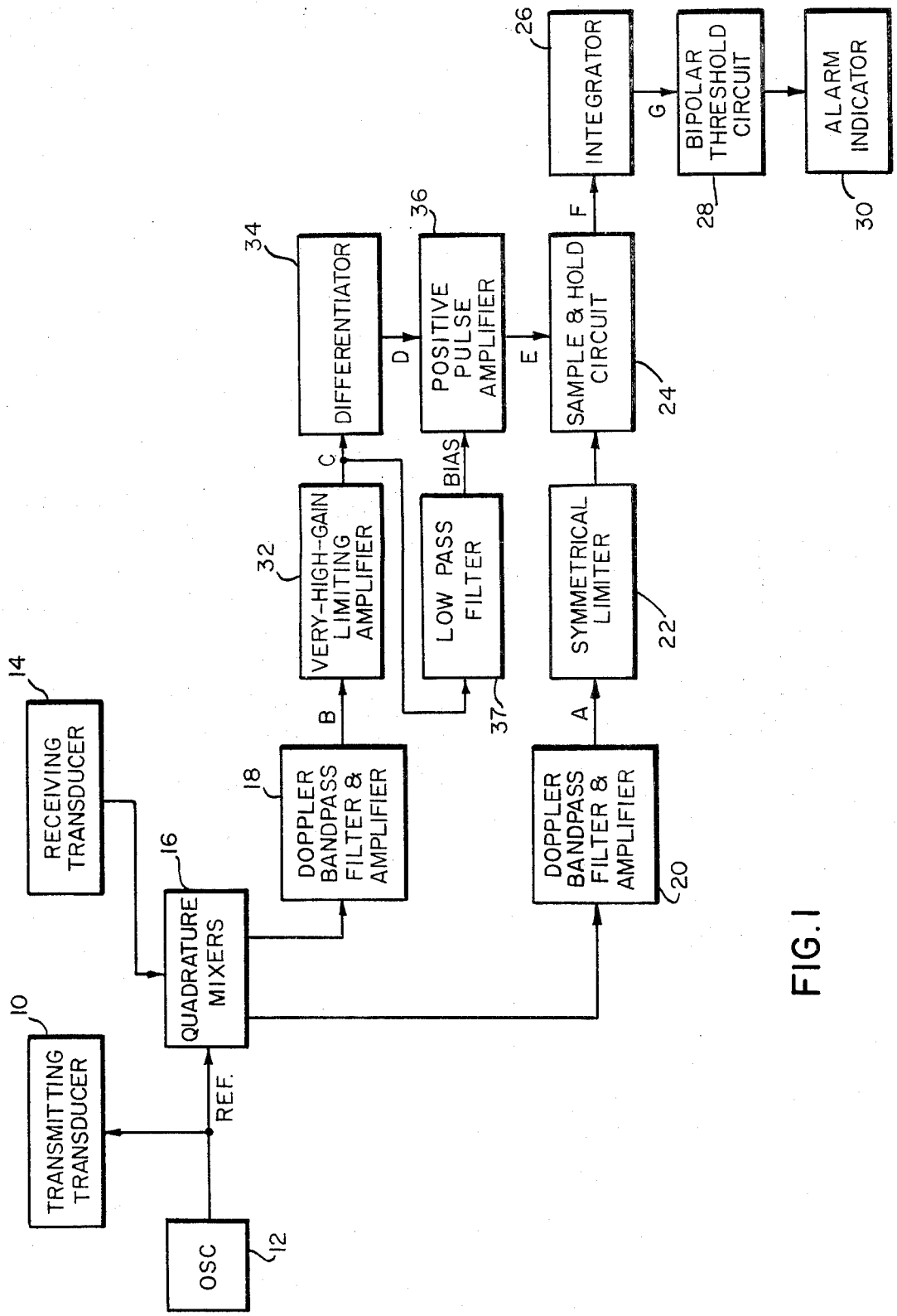
FIG. 1 is a block diagram representation of an intrusion alarm system according to the invention.

An intrusion alarm system constructed and operative according to the invention is illustrated in FIG. 1 and includes a transmitting transducer 10 energized by a signal from an oscillator 12 and operative to direct energy in a predetermined pattern within a zone under surveillance. Energy returned from the surveillance zone is received by a receiving transducer 14, the output of which is applied to one input of a pair of quadrature mixers 16, the other input of which is a reference signal derived from oscillator 12. Quadrature mixers 16 provide a pair of Doppler output signals which are respectively applied to first and second Doppler bandpass filters and amplifiers 18 and 20. For a carrier frequency of 26 KHz, Doppler signals are typically provided in the range of 15 – 1000 Hz. The output of bandpass filter and amplifier 20 is coupled to a symmetrical limiter 22 the output of which is applied to the signal input of a sample and hold circuit 24. The limiter 22 provides linear operation for applied signals within a predetermined amplitude range and limits signals which exceed the boundaries of this range. The output of sample and hold circuit 24 is coupled to an integrator circuit 26 which is of bipolar form to operate on either positive or negative signals and to produce a positive or negative going integrated output signal accordingly. The output signal of integrator 26 is applied to a bipolar threshold circuit 28 which provides an output signal to actuate an alarm indicator 30, or other utilization apparatus.

The output of bandpass filter and amplifier 18 is coupled to a very-high-gain limiting amplifier 32 which is operative to provide a rectangular shaped output signal in response to effectively all input signals applied thereto. The output of limiting amplifier 32 is coupled to a differentiator 34, the output of which, in turn, is coupled to a positive pulse amplifier 36, the output of which provides sample pulses to sample and hold circuit 24. The pulse amplifier 36 is preferably of the type which includes an internal threshold such that only the signals applied thereto above this threshold are amplified to produce narrow pulses for effective sampling of the signal stored in sample and hold circuit 24. In the illustrated embodiment, pulse amplifier 36 operates on the positive polarity pulses provided by differentiator 34; the pulse amplifier can however just as well operate on the negative polarity differentiator pulses if desired in a particular circuit implementation.

Under conditions when a moving target produces low signal amplitudes at low Doppler frequencies, relatively high levels of hum or noise superimposed on the Doppler signal can cause spurious zero-axis crossings from which erroneous sample pulses are derived. Such spurious sample pulses can occur at times when the signal being sampled is of opposite polarity to that intended to be sampled, with the result that significant error in the integrated output signal can arise by improper sampling. To substantially minimize false sampling caused by such noise conditions, a low pass filter 37 is provided for receiving the output signal from very-high-gain limiting amplifier 32 and for producing a bias signal to pulse amplifier 36. Under conditions of low Doppler frequency signals, a time varying bias signal is applied by filter 37 to pulse amplifier 36 to prevent production of sample pulses by the pulse amplifier at times at which sample pulses should not occur.

The output waveform of the low pass filter 37 is of generally triangular form having peaks occurring at the transitions of the rectangular waveform provided by limiting amplifier 32.

When the bias level provided by filter 37 is above a predetermined reference value, in the vicinity of the positive peaks of the low pass filter output signal, the pulse amplifier will not produce sample pulses. As a result, most of the improperly occurring sample pulses caused by noise will be inhibited by action of the low pass filter. At higher Doppler frequencies, above the cutoff point of filter 37, when bias adjustment is not needed, no pulse inhibition is provided. By way of example, for a carrier frequency of 26 KHz, Doppler signals of 100 Hz or less produced by a target moving at about two feet per second or less, can experience improper sampling due to noise components present, and such false sampling is substantially prevented by the bias technique described.

Figure 2A:
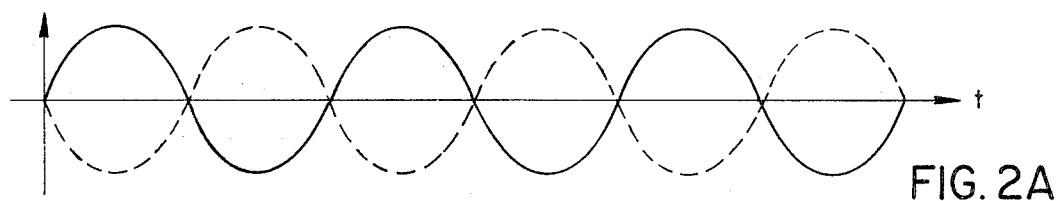
FIGS. 2A – 2G are waveforms useful in illustrating operation of the invention in the presence of a moving target.
Figure 2B:
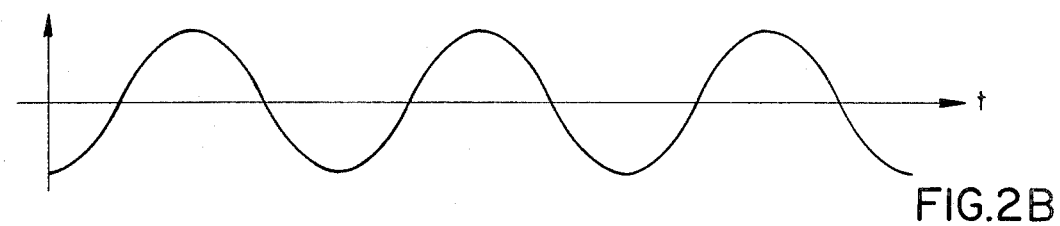

The operation of the system of FIG. 1 in the presence of a moving target will be discussed in conjunction with the waveforms of FIGS. 2A through 2G. The letter designations of the waveform diagrams correspond to the points of FIG. 1 similarly lettered. FIG. 2A depicts the Doppler filtered output signal of bandpass filter and amplifier 20, while FIG. 2B depicts the similar signal from bandpass filter and amplifier 18 which is in phase quadrature with the signal from circuit 20. The illustrated waveform of FIG. 2A in solid line is representative of that which would occur for a target moving toward the receiver, the dotted waveform representing a target moving away from the receiver and which is, accordingly, of 180° phase difference to the waveform produced by an incoming target.

Figure 2C:
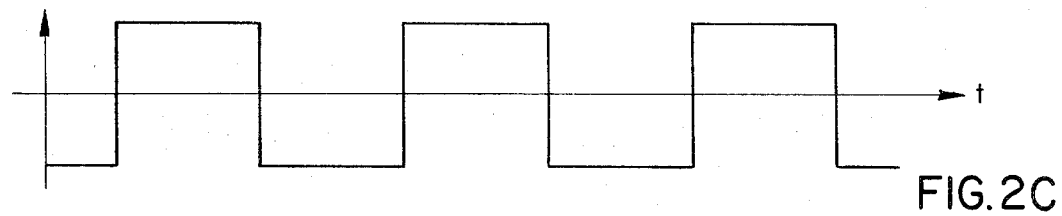
Figure 2D:
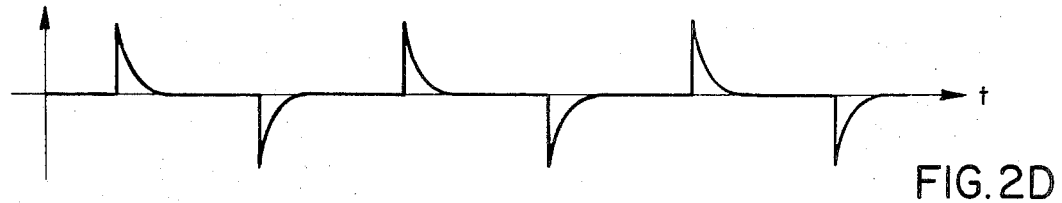
Figure 2E:
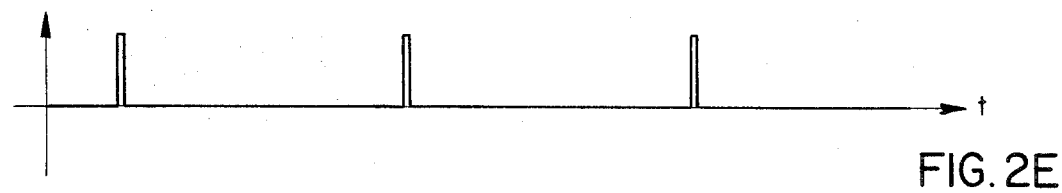

After processing of the waveform of FIG. 2B by very-high-gain limiting amplifier 32, a rectangular wave signal shown in FIG. 2C is produced at the limiter output. The rectangular wave signal is differentiated by differentiator 34 to produce the pulses shown in FIG. 2D which are of alternate positive and negative polarity in accordance with the positive or negative going sense of the rectangular wave being differentiated. The differentiator output pulses are applied to pulse amplifier 36 responsive to signals of positive polarity and which produces output pulses as shown in FIG. 2E. As discussed, the pulse amplifier 36 includes an internal threshold such that only the positive peaks of the input signals applied thereto are amplified to provide the narrow pulses of FIG. 2E occurring in time at the zero crossings of the rectangular wave output from limiting amplifier 32.

Figure 2F:
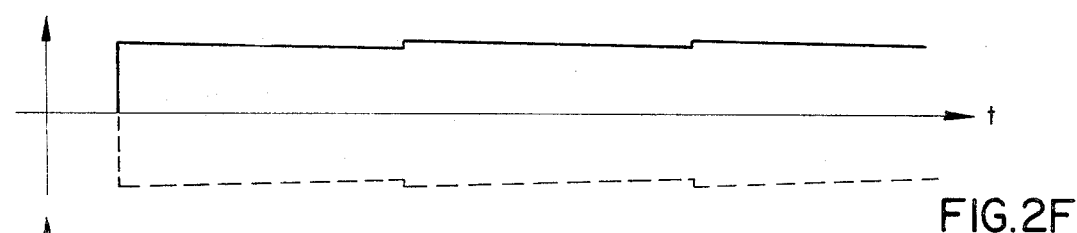

The signal from bandpass filter and amplifier 20 shown in FIG. 2A is applied to a symmetrical limiter 22 which provides limiting action only when the input signal exceeds preset upper and lower reference levels to prevent signal excursions which can cause overloading of the sample and hold circuit, which, in turn, can produce asymmetries resulting in voltage offsets and/or sampled signal levels which drive the integrator too rapidly, both of which could cause false alarms. The sample and hold circuit 24 retains the potential of the signal from limiter 22 at the times specified by the sample pulses from pulse amplifier 36, the output signal of the sample and hold circuit being depicted in FIG. 2F. The solid waveform of FIG. 2F is produced in response to a target moving with one sense, while the dotted waveform is produced for a target moving with opposite sense. As depicted in FIG. 2F, the output signal from the sample and hold circuit decreases slightly due to discharge between sample pulses of the capacitor within the sample and hold circuit. Each subsequent sampling pulse provided by pulse amplifier 35 causes recharging of the circuit capacitor to the sampled level of the input signal applied from limiter 22.

Figure 2G:
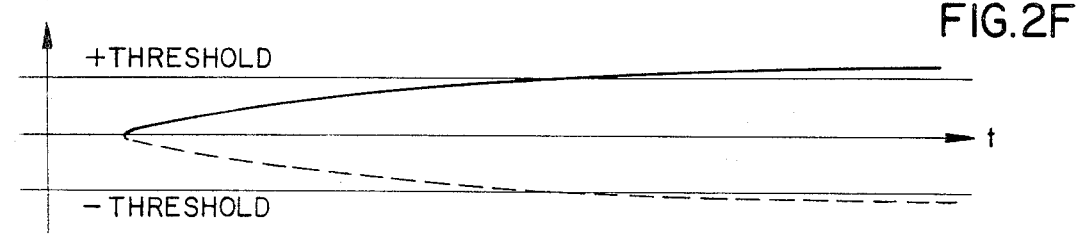

The integrator 26 provides, in response to the output signal of sample and hold circuit 24, either the solid line or dotted line waveform shown in FIG. 2G, depending on the sense of the moving target either toward or away from the transmitter, which is of a value which unidirectionally increases during the duration of the output signal from sample and hold circuit 24. A positive threshold (+ threshold) and a negative threshold (− threshold) are provided by threshold circuit 28 and are of predetermined values the exceedance of which by the integrator output signal causes a signal to be applied to the alarm indicator 30 to cause energization thereof to denote detection of a moving target. In the event that the target is incoming, the integrator output signal is positive going and upon crossing of the positive threshold, causes alarm indication. If the target is outgoing rather than incoming, the output signal of integrator 26 is negative going and upon crossing of the negative threshold, causes alarm actuation. The threshold levels are determined in accordance with the amplitude and duration of expected target signals.

The system described above is thus operative in the presence of target signals to sample the target signal at the positive or negative peak of each cycle depending upon the relative sense of the moving target, the sampled signal providing a unidirectional charging of an integrator to provide an output signal which upon exceedance of a predetermined threshold level causes alarm actuation. The system will produce no alarm indication in the presence of noise or other interfering phenomena and is substantially immune to false alarms in the presence of such noise or spurious signal conditions. The alarm indication may be an audible or visual alarm, or a signal indication of target detection for transmission to a remote receiving site such as a guard or police station.

Figure 3A:
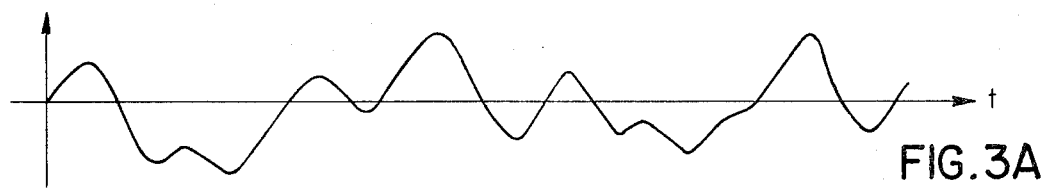
FIGS. 3A – 3G are waveforms useful in illustrating operation of the invention in the presence of interfering phenomena.
Figure 3B:
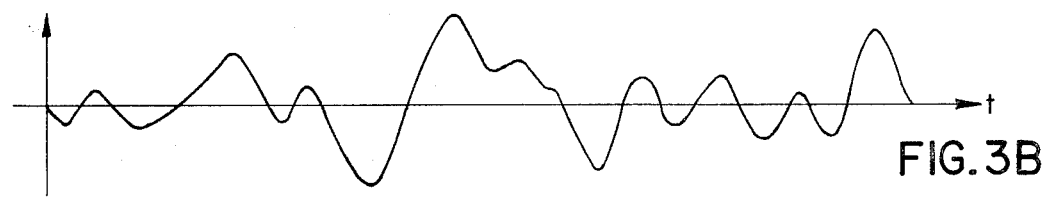

Operation of the system of FIG. 1 in the presence of clutter and noise is discussed in conjunction with the waveforms of FIGS. 3A through 3G. Under such noise conditions, the Doppler signals from quadrature mixers 16, after bandpass filtering and amplification by respective circuits 20 and 18, appear as illustrated in FIGS. 3A and 3B which are seen to be signals having random amplitude and sense.

Figure 3C:
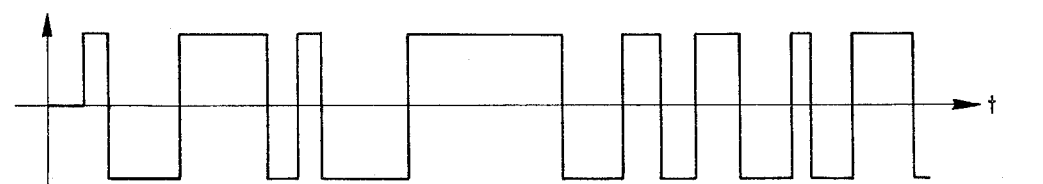
Figure 3D:
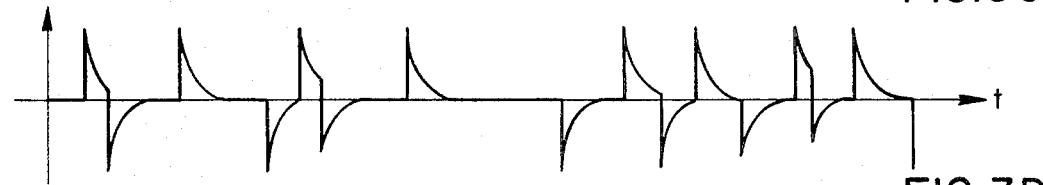
Figure 3E:
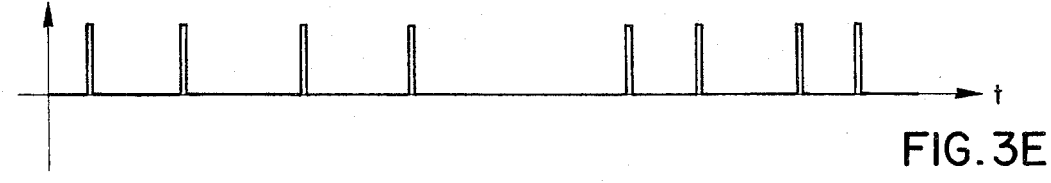
Figure 3F:
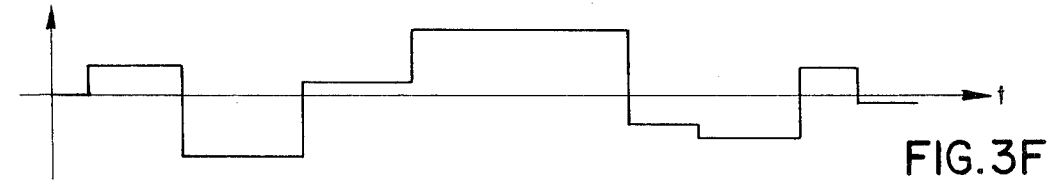
Figure 3G:
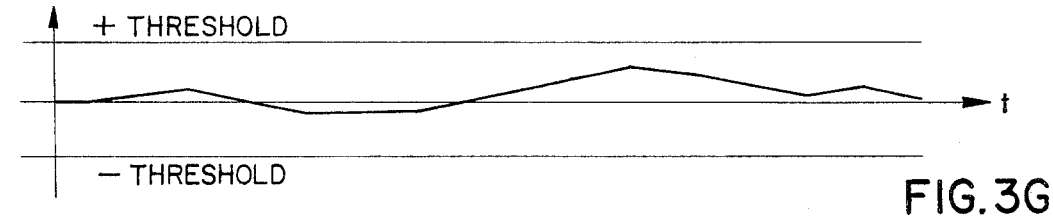

After high gain limiting by limiting amplifier 32, the signal from bandpass filter and amplifier 18 is as shown in FIG. 3C and which is a rectangularly shaped signal provided in response to the zero crossings of the waveform of FIG. 3B. The differentiator output of differentiator 34 is as depicted in FIG. 3D, the positive differentiator output pulses being, after amplification by positive pulse amplifier 36, as depicted in FIG. 3E and which occur at random times depending upon the time of the zero crossings of the waveform of FIG. 3B. The waveform of FIG. 3A is thus sampled at random times and since the waveform of FIG. 3A has a zero mean value, the resultant output signal from sample and hold circuit 24, which is shown in FIG. 3F, also has zero mean value, the resultant output signal from sample and hold circuit 24, which is shown in FIG. 3F, also has zero mean value. The integrator output signal shown in FIG. 3G and which is provided in response to the output signal from sample and hold circuit 24 will not exceed the predetermined threshold provided by threshold circuit 28 but rather will fluctuate above and below a zero reference line. No alarm indication is provided since the preset thresholds are not exceeded by the integrator output signal under the illustrated conditions of clutter and noise.

It will be appreciated that the embodiment of the invention described above is of half-wave configuration being operative in response to either positive or negative Doppler signals to produce one sample per cycle. A full-wave embodiment of the invention is depicted in FIG. 4, wherein two samples per Doppler cycle are provided and which can result in a lower fluctuation level at the output of the integrator in the presence of noise conditions.

Figure 4:
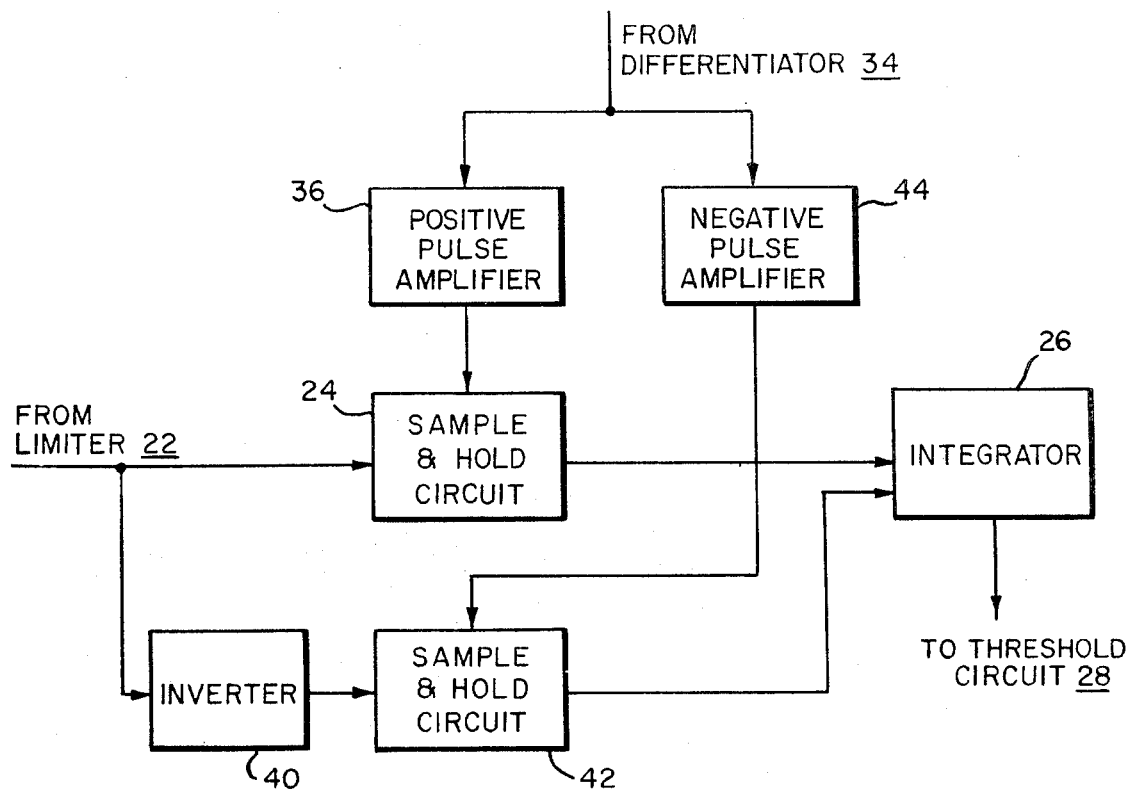
FIG. 4 is a block diagram representation of an alternative embodiment of the system of FIG. 1.

Referring to FIG. 4, the signal from limiter 22 is applied to sample and hold circuit 24 the output of which is applied to one input of integrator 26 as described above in connection with the system of FIG. 1. Sample pulses for sample and hold circuit 24 are provided by positive pulse amplifier 36 which receives the differentiated signals from differentiator 34. The signals from limiter 22 are also applied to an inverter circuit 40 the output of which is applied to a second sample and hold circuit 42. The output of circuit 42 is applied to an input of integrator 26. Sample pulses for sample and hold circuit 42 are provided by a negative pulse amplifier 44 which also receives input signals from differentiator 34. The pulse amplifier 36 is responsive to positive signals from the differentiator, while pulse amplifier 44 is responsive to negative signals therefrom. Integrator 26 is as noted above a bipolar integrator operative to provide an output signal of either positive or negative sense in accordance with the polarity of input signals applied thereto. The output of integrator 26 is applied to threshold circuit 28, as in the system of FIG. 1. Although not illustrated in FIG. 4, the bias adjustment of pulse amplifiers 36 and 44 by low pass filtering of the signal from limiter 32 can be provided as in the embodiment of FIG. 1 to minimize false sampling caused by noise under low Doppler frequency signal conditions.

In operation, the pulse amplifier 36 will produce sample pulses in response to the positive peaks of the differentiator output signal, while the pulse amplifier 44 will produce sample pulses in response to the negative peaks of the differentiator output signal. Two sample pulses per Doppler cycle are thereby provided which will cause, in the presence of noise, a more random and thus a lower fluctuation level in the integrator output signal to further reduce the chance for inadvertent exceedance of the system thresholds to further minimize false alarms. In the presence of a true moving target, the full wave sampling of received quadrature signals permits the output signal from the sample and hold circuits to more nearly maintain its maximum output value, as there is a shorter interval between sample pulses.

It will be appreciated that the invention can be embodied in a variety of configurations and can be implemented in various ways to suit particular operating requirements. Accordingly, it is not intended to limit the invention by what has been particularly shown and described, except as indicated in the appended claims.

What is claimed is:

1. An intrusion alarm system for detecting the presence of a moving target in the presence of interfering phenomena, said system comprising:
    means for transmitting signals into a zone under surveillance;
    means for receiving signals returned from said surveillance zone;
    means operative in response to said received signals to provide first and second signals which include Doppler signals in the presence and representative of a moving target;
    means operative in response to said first signal to produce sample pulses which occur in regular timed relation in the presence of a moving target and at random times in the presence of interfering phenomena;
    means for storing a representation of the amplitude of said second signal at times specified by said sample pulses;
    integrator means for integrating said representation of the amplitude of said second signal and providing an output signal representative thereof, said output signal being of unidirectional increasing magnitude in the presence of a moving target and of randomly varying magnitude in the presence of interfering phenomena;
    threshold means for providing at least one threshold level and an output signal only upon exceedance of said at least one threshold level by said integrator output signal; and
    alarm means for providing an alarm indication in response to the output signal of said threshold means.

2. An intrusion alarm system according to claim 1 wherein said means operative in response to said first signal includes:
    a limiting amplifier operative to provide a rectangular shaped output signal in response to said first signal applied thereto;
    differentiator means operative in response to said rectangular shaped output signal to provide pulses each occurring during a zero crossing of said rectangular shaped output signal, said pulses being of alternate positive and negative sense; and
    a pulse amplifier for amplifying said differentiator pulses of one sense to provide said sample pulses.

3. An intrusion alarm system according to claim 1 wherein said means operative in response to said first signal includes:
    a limiting amplifier operative to provide a rectangular shaped output signal in response to said first signal applied thereto;
    differentiator means operative in response to said output signal to provide pulses each occurring during a zero crossing of said rectangular shaped output signal, said pulses being of alternate positive and negative sense; and
    pulse amplifier means for amplifying said differentiator pulses of both positive and negative sense to provide said sample pulses.

4. An intrusion alarm system according to claim 1 wherein said means for producing sample pulses includes means operative in response to received Doppler signals of predetermined low frequency and having noise components superimposed thereon to inhibit production of sample pulses in the presence of spurious signals caused by said noise components.

5. An intrusion alarm system according to claim 1 wherein said means for storing a representation of the amplitude of said second signal includes:
    limiter means receiving said second signal and providing an output signal representation of said second signal limited to prevent signal excursions above predetermined reference levels; and
    sample and hold means receiving said output signal representation from said limiter means and operative to store the representation of the amplitude of said second signal at times specified by said sample pulses.

6. An intrusion alarm system according to claim 2 including:
    low pass filter means for receiving said rectangular shaped output signal from said limiting amplifier and for providing in response thereto a bias signal for said pulse amplifier to inhibit said sample pulses in the presence of spurious zero crossings of said rectangular shaped output signal caused by low Doppler frequency signals having noise components superimposed thereon.

7. An intrusion alarm system according to claim 1 wherein said means operative in response to said first signal includes:
    a limiting amplifier operative in response to said first signal to provide a rectangular shaped output signal;
    a differentiator circuit operative in response to said rectangular shaped output signal to provide pulses each occurring during a zero crossing of said rectangular shaped output signal;
    pulse amplifier means for amplifying said differentiator pulses of at least one polarity to provide said sample pulses which occur substantially at peaks of said second signal in the presence of a moving target;

low pass filter means operative in response to said rectangular shaped output signal to provide a control signal to said pulse amplifier means to inhibit said sample pulses in the presence of spurious zero crossings of said rectangular shaped output signal caused by noise superimposed on low Doppler frequency signals;

and wherein said means for storing a representation of the amplitude of said second signal includes:

a limiter circuit for receiving said second signal and providing in response thereto an output signal representation of said second signal limited to prevent signal excursions above predetermined reference levels; and a sample and hold circuit for receiving said output signal representation from said limiter circuit and operative to store the representation of the amplitude of said second signal at times specified by said sample pulses.

8. An intrusion alarm system according to claim 2 wherein said means for storing a representation of the amplitude of said second signal includes:

limiter means receiving said second signal and providing an output signal representation of said second signal limited to prevent signal excursions above predetermined reference levels; and sample and hold means receiving said output signal representation from said limiter means and operative to store the representation of the amplitude of said second signal at times specified by said sample pulses.

9. An intrusion alarm system according to claim 7 wherein said threshold means is a bipolar threshold circuit having a positive threshold for moving targets of one sense and a negative threshold for moving targets of opposite sense; and wherein said integrator means is operative to provide a unidirectional output signal of either positive or negative sense in accordance with the sense of target motion.

10. An intrusion alarm system for detecting the presence of a moving target in the presence of interfering phenomena, said system comprising:

means for transmitting signals into a zone under surveillance;

means for receiving signals returned from said surveillance zone;

means operative in response to said received signals to provide first and second signals which include Doppler signals in the presence and representative of a moving target;

means operative in response to said first signal to produce sample pulses which occur in regular timed relation in the presence of a moving target and at random times in the presence of interfering phenomena, and including:

a limiting amplifier operative to provide a rectangular shaped output signal in response to said first signal applied thereto;

differentiator means operative in response to said rectangular shaped output signal to provide pulses each occurring during a zero crossing of said rectangular shaped output signal, said pulses being of alternate positive and negative sense; and first and second pulse amplifiers respectively operative to amplify said differentiator pulses of positive and negative sense to provide first and second trains of sample pulses;

limiter means receiving said second signal and providing an output signal representation of said second signal limited to prevent signal excursions above predetermined reference levels;

first sample and hold means receiving said output signal representation from said limiter means and operative to store the representation of the amplitude of said second signal at times specified by said first train of sample pulses;

means for inverting said output signal representation from said limiter means; and second sample and hold means receiving said inverted output signal representation and operative to store the representation of the amplitude of said second signal at times specified by said second train of sample pulses;

integrator means for integrating said representation of the amplitude of said second signal and providing an output signal representative thereof, said output signal being of unidirectional increasing magnitude in the presence of a moving target and of randomly varying magnitude in the presence of interfering phenomena;

threshold means for providing at least one threshold level and an output signal only upon exceedance of said at least one threshold level by said integrator output signal; and alarm means for providing an alarm indication in response to the output signal of said threshold means.

11. An intrusion alarm system according to claim 10 wherein said threshold means is a bipolar threshold circuit having a positive threshold for moving targets of one sense and a negative threshold for moving targets of opposite sense; and wherein said integrator means is operative to provide a unidirectional output signal of either positive or negative sense in accordance with the sense of target motion.

12. An intrusion alarm system according to claim 10 including:

low pass filter means for receiving said rectangular shaped output signal from said limiting amplifier and for providing in response thereto a bias signal for said pulse amplifiers to inhibit said sample pulses in the presence of spurious zero crossings of said rectangular shaped output signal caused by low Doppler frequency signals having noise components superimposed thereon.

13. An intrusion alarm system for detecting the presence of a moving target in the presence of interfering phenomena, said system comprising:

means for transmitting a signal into a zone under surveillance;

means for receiving signals returned from said surveillance zone;

quadrature mixer means operative in response to said received signals and to a reference signal derived from said transmitted signals to provide first and second signals which include Doppler signals in the presence of a moving target;

means operative in response to said first signal to produce sample pulses which occur in regular timed relation in the presence of a moving target and at random times in the presence of interfering phenomena, said sample pulse producing means including:

a limiting amplifier operative to provide a rectangular shaped output signal in response to said first signal;

a differentiator circuit operative in response to said rectangular shaped output signal to provide pulses each occurring during a zero crossing of said rectangular shaped output signal;

pulse amplifier means operative to amplify said differentiator pulses of at least one polarity to provide said sample pulses; and low pass filter means for receiving said rectangular shaped output signal from said limiting amplifier and for providing in response thereto a control signal for said pulse amplifier means to inhibit said sample pulses in the presence of spurious zero axis crossings of said rectangular shaped output signal caused by low Doppler frequency signals having noise components superimposed thereon;

a limiter circuit operative in response to said second signal to provide an output signal representation of said second signal limited to prevent signal excursions above predetermined reference levels;

sample and hold means receiving said output signal representation from said limiter circuit and operative to store the representation of the amplitude of said second signal at times specified by said sample pulses;

an integrator circuit for providing an integrated output signal in response to said stored representation of the amplitude of said second signal, said integrated output signal being of unidirectional increasing magnitude in the presence of a moving target and of randomly varying magnitude in the presence of interfering phenomena; and a threshold circuit having at least one threshold level which is outside the range of said randomly varying integrated output signal, and operative to produce an alarm signal only upon exceedance of said at least one threshold level by said integrated output signal.

* * * * *